United States Patent [19]

Kiestra et al.

[11] 4,372,249

[45] Feb. 8, 1983

[54] VOLUMETRIC APPARATUS FOR MILK AND METHOD OF MEASURING THE TOTAL QUANTITY OF MILK COLLECTED FROM A COW IN MILKING

[75] Inventors: Philippus P. Kiestra, Twijzel, Netherlands; Christian Icking, Oelde, Fed. Rep. of Germany

[73] Assignee: Westfalia Separator AG, Oelde Westfalen, Fed. Rep. of Germany

[21] Appl. No.: 266,036

[22] Filed: May 22, 1981

[30] Foreign Application Priority Data

May 28, 1980 [DE] Fed. Rep. of Germany ....... 3020161

[51] Int. Cl.³ .............................................. A01J 9/00
[52] U.S. Cl. .............................. 119/14.17; 119/14.46
[58] Field of Search ............... 119/14.05, 14.06, 14.08, 119/14.17, 14.46, 14.02; 73/224, 221

[56] References Cited

U.S. PATENT DOCUMENTS 3,919,975 11/1975 Duncan ............................ 119/14.05
4,185,586  1/1980 Flocchini ........................ 119/14.08

Primary Examiner—Hugh R. Chamblee

Attorney, Agent, or Firm—Sprung, Horn, Kramer & Woods

[57] ABSTRACT

A volumetric apparatus for milk (FIG. 1) for use by milking plants in the direct measurement of the quantity of milk collected from a cow in milking. The instrument comprises a vacuum separating chamber 1 for separation of the milk from the milk-air mixture drawn from the cow and, following said separating chamber, a measuring chamber 7 for the milk which at its lower end is provided with a milk outlet opening 15 and a valve plug 16 for selectively closing of said outlet opening. The measuring chamber is outfitted with a measuring means, and the separating chamber 1 is connected to the measuring chamber (7) through a constantly open inlet opening (6) of such size that the same pressure prevails in both chambers throughout the measuring operation. A collecting means follows the measuring chamber and communicates with the measuring chamber for receiving milk therefrom when the outlet opening 15 is opened by the valve plug. An air-conducting pipe (8) extends from adjacent the separating chamber to the collecting means. The measuring means is adapted to make partial quantity measurements while the inflow of milk into the measuring chamber (7) continues.

11 Claims, 3 Drawing Figures

VOLUMETRIC APPARATUS FOR MILK AND METHOD OF MEASURING THE TOTAL QUANTITY OF MILK COLLECTED FROM A COW IN MILKING

BACKGROUND OF THE INVENTION

The invention relates to a volumetric apparatus for milk for use by milking plants in the direct measurement of the quantity of milk collected from a cow in milking, which comprises a vacuum separating chamber for separation of the milk from the milk-air mixture drawn from the cow and, following said separating chamber, a measuring chamber for the milk which at its lower end is provided with a milk outlet opening adapted to be closed by a valve plug and associated with a measuring means.

The invention further relates to a method of measuring the total quantity of milk collected from a cow in milking.

A volumetric apparatus for milk of the type mentioned is known from German patent application DOS 28 10 376. In that apparatus, the separating chamber is connected to the measuring chamber through a milk inlet opening that can be closed by a valve plug. That valve plug is attached to a positioning rod whose lower end carries a further valve plug through which the milk outlet opening provided in the bottom of the measuring chamber can be closed. When the milk inlet opening is opened by the upper valve plug, the milk outlet opening of the measuring chamber is closed by the lower valve plug, and vice versa.

In that apparatus, the separating chamber must be provided with a pipe connection for a vacuum pipe. During operation, milk vapors will penetrate into that vacuum pipe, which therefore has to be cleaned.

When the milk inlet opening leading to the measuring chamber is closed, the milk collected from the cow must be accommodated by the separating chamber, which must be dimensioned accordingly. Valve control with a positioning rod and two valve plugs is expensive to implement and also results in different pressure conditions in the separating chamber and the measuring chamber.

SUMMARY OF THE INVENTION

The object of the invention is to construct a volumetric apparatus for milk of the type mentioned above in such a way that it is of compact size, dispenses with a vacuum pipe running externally to the separating chamber, and works with high measuring accuracy.

In accordance with the invention, this object is accomplished in that the separating chamber is connected to the measuring chamber through a constantly open inlet opening; that the same pressure prevails in both chambers throughout the measuring operation; that an air-conducting pipe extends from the separating chamber to a collecting chamber or a collecting pipe; and that measurements of partial quantities can be performed while the inflow of milk into the measuring chamber continues.

Since the total quantity of milk yielded by a cow during milking is determined from partial-quantity measurements while the inflow of milk into the measuring chamber is maintained, the separating chamber can have a small overall height and small dimensions. The milk-air mixture drawn from the cow can be fed to the separating chamber tangentially, with the milk then filling the outer zone of the separating chamber while the air reaches the middle zone of the separating chamber and from there flows through an air-conducting pipe to a collecting chamber or collecting pipe. The milk flows from the separating chamber through an always open inlet opening into a measuring chamber in which the same pressure conditions prevail as in the separating chamber.

In the measuring chamber, partial-quantity measurements are made until diminishing amounts of milk indicate the completion of the milking operation, when the volumetric apparatus is disconnected and the next milk measurement is automatically prepared, there being no need for manual intervention. The completion of the measuring operation may be utilized to initiate further operations, such as removal of the milking gear.

Since only partial-quantity measurements are made and the total quantity of the milk is determined by adding those measurements, the measuring chamber can also be of small size.

The volumetric apparatus for milk in accordance with the invention can be used with various measuring methods, which will now be described along with embodiments of the volumetric apparatus with reference to the accompanying drawings.

DETAILED DESCRIPTION OF THE INVENTION

Figure 1:
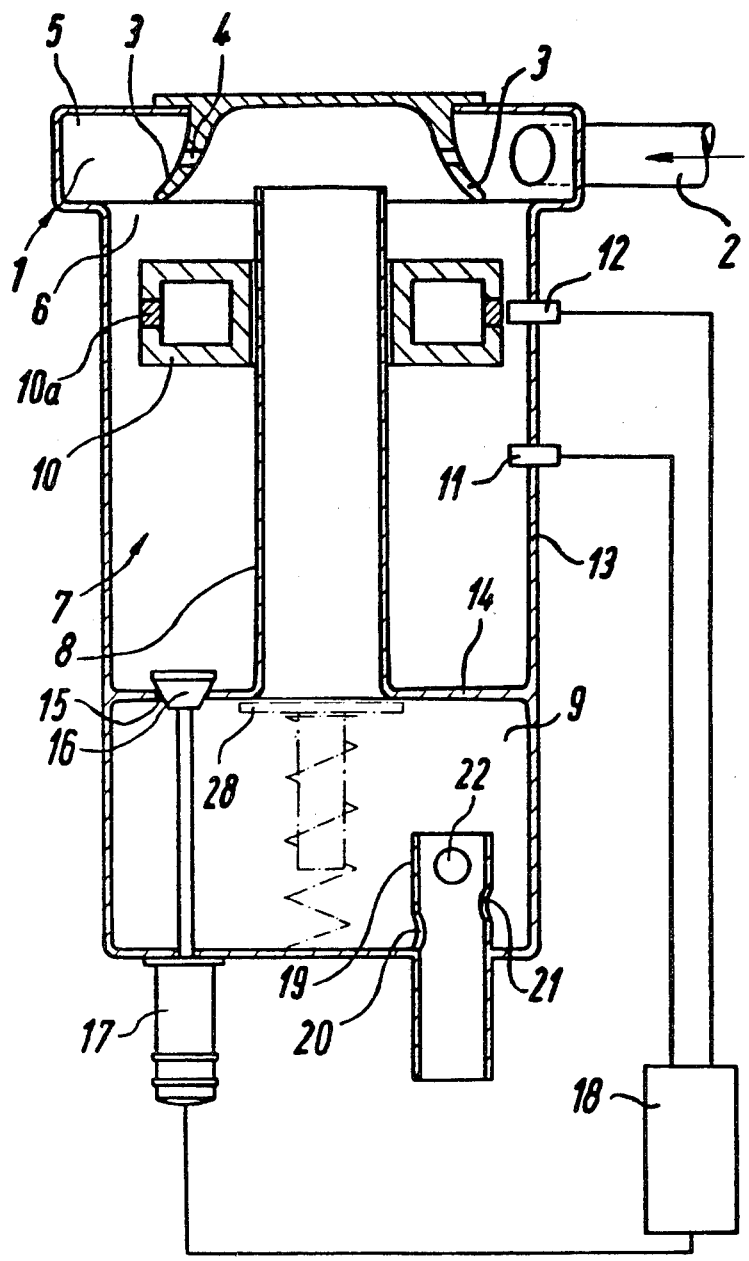
FIG. 1 is a vertical section through a volumetric apparatus for milk in which a collecting chamber is disposed below the measuring chamber.

The volumetric apparatus for milk shown in FIG. 1 is provided with a separating chamber 1 to which the milk-air mixture drawn from the cow is fed tangentially through a feed pipe 2. The separating chamber 1 is equipped with guide vanes 3 provided with passages 4 for the air which separates from the milk-air mixture, the milk filling the outer zone 5 of the separating chamber 1. Through a constantly open inlet opening 6 the milk reaches a measuring chamber 7 while the air flows through an air-conducting pipe 8 into a collecting chamber 9.

In the embodiment illustrated in FIG. 1, a float 10 is slidably mounted on the air-conducting pipe 8. Said float, which is provided with a permanent magnet 10a, cooperates with two magnet sensors 11 and 12 which are fixed in the wall 13 of the measuring chamber.

In the bottom 14 of the measuring chamber, a milk outlet opening 15 is provided which can be closed by a valve plug 16. The latter is part of an electromagnetically actuated valve 17 which through electronic means is electrically connected to the magnet sensors 11 and 12. When the magnetic sensor 12 responds to the float, the valve plug 16 is moved into the open position. The milk then flows from the measuring chamber 7 into the collecting chamber 9, into which a discharge pipe stub 19 projects that is connected to the milk pipe and may have vertically staggered discharge openings 20, 21 and 22.

The volume $V_1$ of the measuring chamber between the magnet sensors 11 and 12 is smaller than the volume $V_2$ of the collecting chamber 9.

When during the discharge of the milk from the measuring chamber the float 10 descends far enough for its magnet 10a to cooperate with the magnet sensor 11, the valve 17 is moved into the closing position.

Figure 2:
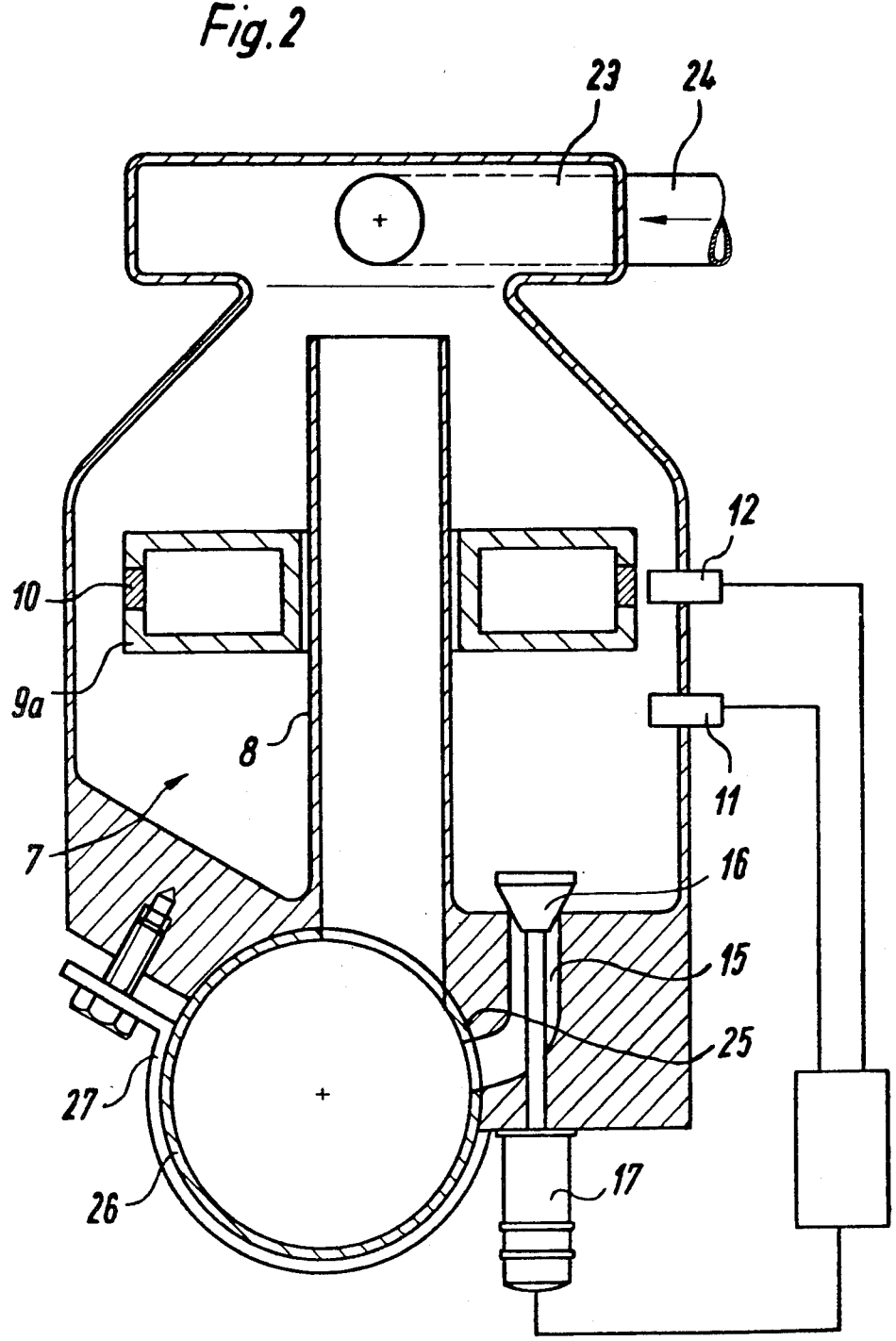
FIG. 2 is a sectional view of a volumetric apparatus for milk in which the bottom of the measuring chamber is provided with a troughlike groove for accommodation of a portion of the milk collecting pipe.

In the embodiment illustrated in FIG. 2, the construction of the separating chamber 23, to which the milk-air mixture drawn from the cow is fed tangentially, for example, through the pipe 24, differs somewhat from that of separating chamber 1, especially since here no guide vanes are provided. The bottom of the measuring chamber 7 is provided with a troughlike groove 25 for accommodation of a portion of the collecting pipe 26 for the milk. The air-conducting pipe 8 discharges into the collecting pipe 26. The volumetric apparatus is fastened to the collecting pipe 26 through a clamp 27.

The valve 17 is controlled on the basis of the filling level. Its control may be effected by means other than those described and may be magnetic, mechanical, pneumatic or the like.

To employ a method in accordance with the invention to measure the total quantity of milk yielded by a cow in milking, the milk outlet opening 15 is constructed as a calibrated opening. The valve 17 opens the milk outlet opening 15 when the filling level of the milk in the measuring chamber reaches the upper magnet sensor 12. The milk outlet opening is closed by the valve plug 16 when the filling level of the milk reaches the lower magnet sensor 11.

If A is the cross-sectional area of the calibrated milk outlet opening, $\mu$ is the constant discharge factor of that milk outlet opening, h is the average filling level of the milk in the measuring chamber 7, $Q_i$ is the amount of milk discharged through the opening 15 per valve actuation, $t_i$ is the discharge time per valve actuation, and $Q_{ges}$ is the total quantity of the milk, the following system of equations is obtained:

$$Q_i = A \times \mu \times \sqrt{2gh} \times t_i$$

$$Q_{ges} = A \times \mu \times \sqrt{2gh} \times t_{ges}$$

$$t_{ges} = \sum_{i=1}^{n} t_i$$

Thus, for determination of the total quantity of milk, the individual opening times of the valve 17 are added.

To the quantity of milk so determined, the amount of milk present in the measuring chamber below the magnet sensor 11 must be added.

The total quantity of milk may be processed and indicated by electronic means.

For the second measuring method in accordance with the invention, the milk outlet opening 15 is likewise constructed as a calibrated opening. However, in this method only the upper magnet sensor 12 is needed. When the filling level of the milk in the measuring chamber 7 reaches the upper magnet sensor 12, the valve 17 opens the milk outlet opening 15. The valve 17 closes the milk outlet opening after a preset time.

If $Q_t$ is the quantity of milk discharged from the measuring chamber per valve actuation, t is the constant opening time of the valve 17, and Q is the total quantity of milk, the following system of equations is obtained:

$$Q_t = A \times \mu \times \sqrt{2gh} \times t$$

$$Q_t = \text{constant}$$

$$Q = Q_t \times n \quad (n = \text{number of valve actuations})$$

The number of times that the outlet valve has been opened is added.

With this measuring method, the constant discharge time should be selected as small as possible, or then provision should be made, by inclusion of an electronic circuit, for example, for compensating for the fact that the discharge level is no longer constant.

In a further measuring method, the milk outlet opening 15 need not be constructed as a calibrated opening.

As the measuring chamber is being filled, with the valve 17 closed, the two magnet sensors 11 and 12 or some other means are used to measure the time $c_i$ required by the float 10 to rise from the lower magnet sensor to the upper. During that time, the volume V is introduced into the measuring chamber. When the upper measuring point is reached, the milk outlet opening 15 is opened and kept open through the valve 17 until the float has descended to the lower measuring point in the time $d_i$. Then the valve is closed and the float again rises.

Figure 3:
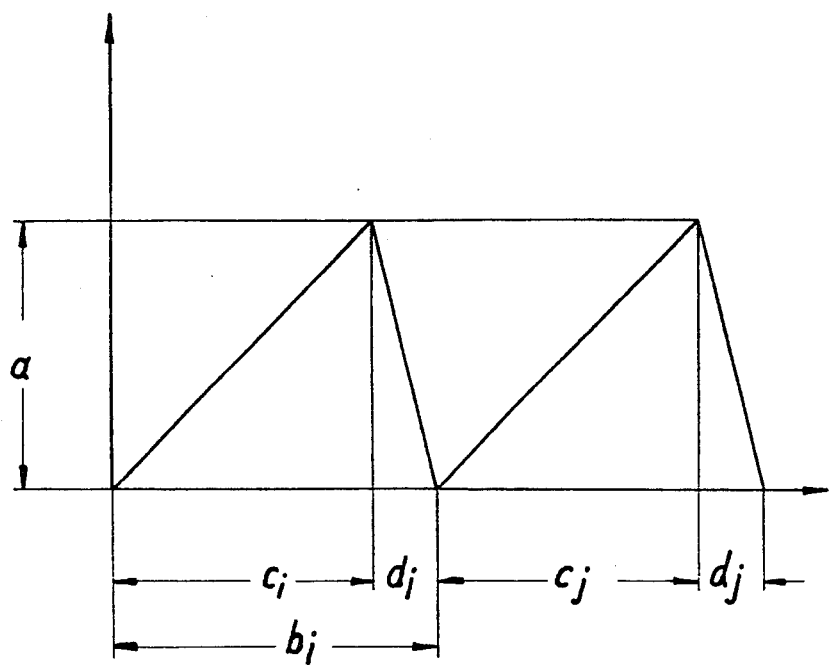
FIG. 3 is a graph.

$Q_i = V/c_i$ is the average inflow during the time $c_i$. If it is assumed that the inflow remains a constant $Q_i$ during the time $d_i$, then the volume added during the time $b_i = c_i + d_i$ (FIG. 3) is:

$$V_i = Q_i \times b_i = (b_i/c_i) \times V.$$

With n measurements, the total volume is:

$$Q_{ges} = \sum_{i=1}^{n} V_i = V \times \sum_{i=1}^{n} \frac{b_i}{c_i}$$

The error made in that assumption will be small when the outflow is large, which may be accomplished through a large outlet opening or by producing a pressure difference between the measuring chamber and the collecting chamber or collecting pipe. This pressure difference may be produced through a valve 28, for example, in the vicinity of the air-conducting pipe 8. Valve 28 is indicated in FIG. 1 by dash-dotted lines.

With this measuring method, it is not a requirement that the discharge be constant, and the construction of the milk outlet opening 15 therefore is not critical.

With this measuring method, the apparatus can be very compact since the measuring accuracy is independent of the filling level.

It will be appreciated that the instant specification and claims are set forth by way of illustration and not of limitation, and that various changes and modifications may be made without departing from the spirit and scope of the present invention.

What is claimed is:

1. In a device for directly measuring the quantity of milk obtained from a cow being milked by a mechanical milking apparatus, the device having a vacuum separating chamber receptive of a milk-air mixture from a cow for separating the milk from the air, a milk measuring chamber downstream of the separation chamber and having an outlet at the bottom thereof, means providing liquid communication between the separating and measuring chambers, means for sensing at least one liquid level in the measuring chamber and valve means for opening and closing the measuring chamber outlet in response to the liquid level sensed by the sensing means, the improvement wherein the means providing liquid communication between the separating and measuring chamber comprises a constantly open inlet aperture permitting a continuous flow of milk from the separating chamber and further comprising means for making partial-quantity measurements of the milk during the flow of milk into the measuring chamber.

2. The device according to claim 1, further comprising collecting means downstream of the discharge outlet of the measuring chamber, an air-conduction pipe extending between the separating chamber and the collecting means and valve means for opening and closing the air conduction pipe to produce a pressure difference between the measuring chamber and the collecting means.

3. The device according to claim 1 or 2, wherein the separating chamber includes guide vanes having air passages therethrough in the vicinity of the inlet aperture.

4. The device according to claims 1 or 2, wherein the collecting means comprises a collecting chamber having a discharge pipe projecting therein from the bottom thereof and having vertically staggered outlet openings.

5. The advice according to claim 1 or 2, wherein the collecting means comprises a collecting pipe and a trough-like groove in the bottom of the measuring chamber in which a portion of the collecting pipe is received.

6. The device according to claim 1 or 2, wherein the sensing means comprises two vertically spaced apart magnetic level sensors in the measuring chamber defining a volume therebetween which is smaller than the volume of the collecting means.

7. A method for directly measuring the quantity of milk obtained from a cow being milked by a mechanical milking apparatus, comprising the steps of:
vacuum separating milk from a milk-air mixture from a cow;
continuously freely feeding the separated milk to a measuring chamber;
sensing the level of the milk in the measuring chamber at at least one level from the bottom thereof;
discharging the milk from the measuring chamber through a valved calibrated outlet by opening same when the level of the milk in the measuring chamber reaches said one level; and
determining the quantity of milk from partial quantity measurements during the flow of milk into and out of the measuring chamber.

8. The method according to claim 7, wherein the outlet is open for a predetermined length of time each time the milk reaches said one level and the total open time is determined from the product of the number of openings and said predetermined length of time.

9. The method according to claim 7, wherein the level is sensed at a second level below said first level and wherein the outlet is closed when the second level is reached and the quantity is determined from the total time that the outlet is open.

10. The method according to claim 7, wherein the level in the measuring chamber is sensed at a lower level than said one level and the total volume is determined by measuring the filling time between the lower level and said one level to determine a momentary flow rate, calculating the average quantity added during the filling time, measuring the discharge time when the outlet is open and calculating the total quantity from the sum of the filling time and the discharge time.

11. The method according to claim 7, further comprising terminating the measurement of the milk at the end of a predetermined filling time.

* * * * *